United States Patent [19]
Casto

[11] Patent Number: 6,038,547
[45] Date of Patent: Mar. 14, 2000

[54] CONSTRUCTION TRACKING AND PAYMENT METHOD AND SYSTEM

[76] Inventor: Robin L. Casto, 1280 W. Peachtree St. NW. #1505, Atlanta, Ga. 30309

[21] Appl. No.: 09/003,807

[22] Filed: Jan. 7, 1998

[51] Int. Cl.[7] .................................................. G06F 17/60
[52] U.S. Cl. ............................................. 705/30; 705/40
[58] Field of Search .................................. 705/1, 30, 32, 705/40; 395/500.01; 700/97

[56] References Cited

U.S. PATENT DOCUMENTS

| | | | |
|---|---|---|---|
| 4,700,318 | 10/1987 | Ockman | 345/431 |
| 4,782,448 | 11/1988 | Milstein | 705/400 |
| 4,851,999 | 7/1989 | Moriyama | 705/30 |
| 5,189,606 | 2/1993 | Burns et al. | 705/10 |
| 5,272,623 | 12/1993 | Grubb et al. | 705/1 |
| 5,755,072 | 5/1998 | Lingafelter | 395/500.01 |
| 5,793,632 | 8/1998 | Fad et al. | 705/1 |
| 5,799,286 | 8/1998 | Morgan et al. | 705/30 |
| 5,815,829 | 9/1998 | Zargar | 705/30 |

OTHER PUBLICATIONS

Hart, Gerard J. "Integrated project control and communications systems." Transactions of the AACE International (1074–7397), pp. IT61–IT65, 1996.

"Sourcemate releases powerful new job cost program." Dateline, Mill Valley, CA., Aug. 1987.

"State of the Art broadens market with introduction of vertical application M*A*S 90 job cost accounting package." Dateline, Costa Mesa, CA, Sep. 1987.

"M.W. Kellogg computerizes job site accounting." News Release, Dateline, Farmingdale, NJ, Jan. 1992.

Binsaca, Rich. "Third–party management." Builder, v. 16, n. 2, p. 228, Feb. 1993.

"Sirius software introduces BBS." Productivity Software, v. 8, n. 4, Apr. 1995.

*Primary Examiner*—Allen R. MacDonald
*Assistant Examiner*—Michele Stuckey Crecca
*Attorney, Agent, or Firm*—Oblon, Spivak, McClelland, Maier & Neustadt, P.C.

[57] ABSTRACT

A computer-based tracking system and method for coordinating work done on a project and payment therefor. After a project has been partitioned by an architect, jobs are specified in terms of to which region or subregion each entry corresponds. The (sub)contractors submit monthly Application and Certificate for Payment requests which are organized by the system to enable all the work in a particular region to be consolidated listed on a reviewer's card for ease of verification. Updates to the requests are made and authorized forms are generated to enable payment of the requests, thereby saving time and effort to perform manual correlation of subcontractor requests with a given area in a project. Requests also need not be monthly and may be made at any period, potentially varying. Other possible periods are quarterly, twice a month, or once every two months.

17 Claims, 5 Drawing Sheets

APPLICATION AND CERTIFICATE FOR PAYMENT       AIA DOCUMENT G702

TO OWNER                                PROJECT   4                       APPLICATION NO.   3                DISTRIBUTION TO
                                                  New Office Construction PERIOD TO  06/25/1997              [ ] OWNER
    Nash Partnership                                                      PROJECT NOS.                       [ ] ARCHITECT
    333 Maple St.                                                                                            [ ] CONTRACTOR
    Arlington, VA  22207                                                                                     [ ]
FROM CONTRACTOR                         VIA ARCHITECT                     CONTRACT DATE                      [ ]
    Joplin Concrete Co.                                                                03/24/1997
                                            Stills and Associates,                     97-001-01
                                            222 Elm St.
                                            Arlington, VA  22207

CONTRACTOR
    New Office Construction

CONTRACTOR'S APPLICATION FOR PAYMENT                                      CERTIFICATION

1  ORIGINAL CONTRACT SUM                    $  95,000.00
2  Net Change by Change Orders              $   1,000.00
3  CONTRACT SUM TO DATE (Line 1-2)          $  96,000.00                  By _____  Date _____
4  TOTAL COMPLETED & STORED TO DATE         $  40,746.00                  State of:
   (Column G on G705)                                                     County of:
                                                                          Subscribed and sworn to before
                                                                          me this         day of Notary Public
                                                                          My Commission Expires:

(CONTINUED FROM FIG. 1A)

5  RETAINAGE:

a. _____ % of Completed Work
(Columns D & E on G703)                                             $ 4,074.60 b. _____ % of Stored Material
(Columns F on G703)                                                 $   860.00

Total Retainage (Line 5a & 5B or
Total in Column 1 of G703)                                          $ 4,934.60

6  TOTAL EARNED LESS RETAINAGE
(Line 4 less Line 5 Total)                                          $ 35,811.40

7  LESS PREVIOUS CERTIFICATES FOR PAYMENT
(Line 6 from prior Certificate)                                     $ 14,092.20

8  CURRENT PAYMENT DUE                                              $ 21,719.00

9  BALANCE TO FINISH, INCLUDING RETAINAGE
(Line 3 less Line 6)                                                $ 60,188.60

| CHANGE ORDER SUMMARY | ADDITIONS | DEDUCTIONS |
|---|---|---|
| Total changes previous months | 0.00 | 0.00 |
| Total approved this Month | 1,000.00 | 0.00 |
| TOTALS | 1,000.00 | 0.00 |
| NET CHANGES by Change Order | 1,000.00 | |

ARCHITECT'S CERTIFICATE FOR PAYMENT

CERTIFICATION

AMOUNT CERTIFIED  $ _____          Date: _____

| CONTINUATION SHEET | AIA DOCUMENT G703 | | | | | APPLICATION NO: APPLICATION DATE: 06/11/1997 PERIOD TO: 06/25/1997 ARCHITECT'S PROJECT NO: 06/25/1997 | 3 | | |
|---|---|---|---|---|---|---|---|---|---|
| A | B | C | D | E | F | G | H | I |
| ITEM NO. | DESCRIPTION OF WORK | SCHEDULED VALUE | WORK COMPLETED | | MATERIALS PRESENTLY STORED (NOT IN D OR E) | TOTAL COMPLETED AND STORED TO DATE (D,E,F) | % (G÷I) | BALANCE TO FINISH (C-G) | RETAINAGE (OF VARIABLE RATE) |
| | | | FROM PREVIOUS APPLICATION (D,E) | THIS PERIOD | | | | | |
| | 99999-CHANGE ORDER | 1,000.00 | 1,000.00 | 0.00 | 0.00 | 1,000.00 | 100.00 | 0.00 | 100.00 |
| | 03100-CONCRETE FORMS AND ACCESSORIES | 10,000.00 | 6,900.00 | 100.00 | 100.00 | 7,100.00 | 71.00 | 2,900.00 | 710.00 |
| | 03100-CONCRETE FORMS AND ACCESSORIES | 10,000.00 | 3,100.00 | 250.00 | 150.00 | 3,500.00 | 35.00 | 6,500.00 | 350.00 |
| | 03100-CONCRETE FORMS AND ACCESSORIES | 10,000.00 | 5,456.00 | 200.00 | 100.00 | 5,756.00 | 57.56 | 4,244.00 | 575.60 |
| | 03100-CONCRETE FORMS AND ACCESSORIES | 10,000.00 | 2,985.00 | 115.00 | 100.00 | 3,200.00 | 32.00 | 6,800.00 | 320.00 |
| | 03300-CAST-IN-PLACE CONCRETE | 20,000.00 | 5,123.00 | 100.00 | 150.00 | 5,373.00 | 26.86 | 14,627.00 | 537.30 |
| | 03300-CAST-IN-PLACE CONCRETE | 15,000.00 | 3,567.00 | 290.00 | 110.00 | 3,967.00 | 26.44 | 11,033.00 | 396.70 |
| | 03300-CAST-IN-PLACE CONCRETE | 10,000.00 | 4,678.00 | 122.00 | 100.00 | 4,900.00 | 49.00 | 5,100.00 | 490.00 |
| | 03300-CAST-IN-PLACE CONCRETE | 10,000.00 | 5,765.00 | 135.00 | 50.00 | 5,950.00 | 59.50 | 4,050.00 | 595.00 |
| | | 96,000.00 | 38,574.00 | 1,312.00 | 860.00 | 40,746.00 | | 55,254.00 | 4,074.60 |

FIG. 2

CONSTRUCTION TRACKING AND PAYMENT METHOD AND SYSTEM

BACKGROUND OF THE INVENTION

1. Field of the Invention

The present invention is directed to a computer-based tracking system, and more specifically to a construction tracking and payment method and system for coordinating work done on a project and payment therefor.

2. Discussion of the Background

In known construction projects, each month all contractors and subcontractors on large construction projects throughout the country submit applications for payment to architects and owners for review and payment. On large construction projects there are a large number of applications that the architect and the general contractor must review separately to determine if payments should be made. These applications are broken down in terms of materials, labor, and areas of the project completed. They are very lengthy and complex at times. Different (sub)contractors can break down the building or project into differently defined areas. This causes the problem that the architect and general contractor must analyze each of the many applications without the benefit of any correlation of work between (sub)contractors. (In the present application, since the jobs of subcontractors and contractors can be interchangeable depending on the size of a job, the term (sub)contractor will be used throughout to refer to either.) Further, this is often disruptive if done in the middle of a busy construction site. This results in a time-consuming and inefficient analysis of what work has been completed and often results in payment for work that has not actually been performed.

Traditional Application and Certificate for Payment requests consist of two forms (known as G702 and G703) from the American Institute of Architects. FIGS. 1A, 1B and 2 are completed simulated copies of form G702 and G703, respectively, for a mythical Joplin Concrete Company and will be used to describe the traditional payment approach as well as the operation of the present invention. (Blank forms G702 and G703 are incorporated herein in their entirety by reference.) FIGS. 1A and 1B include a summary of the administrative portions of the contract for a job, including the name of the construction project, the name and address of the owner of the construction project, the name and address of the architect, and the name (and optionally address) of the contractor requesting payment. In the section entitled Contractor's Application for Payment, the form includes a summary of the costs associated with the contractor's work. Although a summary is provided in this section, the actual costs are broken down in more detail in terms of units of work on Form G703, as shown in FIG. 2. Line 1 of Joplin Concrete Co.'s application in FIG. 1A states that the contract as a whole was worth $95,000, which is the sum of the Scheduled Value column, column C, in FIG. 2, excluding any Change Orders. (Change Orders are requests for modifications which are authorized by the architect on site and/or the owner and usually arise as a result unforseen or unforeseeable design choices. Since they are unforseen or unforeseeable, they are not part of the original contract and must be administered as the changes occur.) As seen in FIG. 2, the total of column C is $96,000, but this includes a single $1,000 change that was not part of the original contract. Therefore, Line 1 of FIG. 1A states that the original contract was worth $95,000 while Line 2 shows the value of all the changes is $1,000. The correlation of these numbers has traditionally been the responsibility of the subcontractor to keep right, but the reviewer also has to verify their accuracy to avoid payment above the agreed upon price.

Each month, besides adding change orders to the Form G703, the amount of work completed must be updated. Column D of FIG. 2 is updated by adding columns D and E of the previous application and entering the values, item-by-item, into column D. Column E is then updated to reflect the work completed in the current billing period (usually a month). When the reviewer does not have a copy of the previous application at the time of review, it is difficult for the reviewer to know if the values in column D have been correctly filled-in. As such, discrepancies in the amount of performed versus worked may be overlooked because the previous amount of work completed is inadvertently incorrect. If the reviewer tries to track both reports, the review process becomes even more cumbersome since twice the number of reports must be carried.

Column F of FIG. 2 represents the amount of materials stored on the site that have not yet been put into place. For example, in the case of the mythical concrete company, supplies such as yet-to-be used concrete may be stored on the site and represent a future reimbursable expenditure for the subcontractor. FIG. 2 has four work entries for concrete forms and accessories, each with some materials stored on the site. The contractor also has four work entries for cast-in-place concrete that each have materials stored on site. Traditionally, it could be difficult for a reviewer to know exactly what materials go with which work item since (sub)contractors have been free to break down a construction site in a fashion which suits them rather than the owner or architect.

The first part of column G of FIG. 2 represents the total value of the stored materials plus the work that has been done so far. The second part of column G includes the percentage completion of the contracted work as a whole (work plus materials). Column H includes the balance for the remaining work. Column I includes the retainage—i.e., the amount of money set aside until the contract has been completed and signed off by the architect. This money is held to ensure that the last of the work is completed. In the example, the retainage is 10 percent of the work completed so far.

When the calculations have been complete on the Form G703 (or on multiple Forms G703 when the details run more than one page as is often the case), the totals are summarized in lines 4–9 of form G702. The total work completed is entered on Line 4 of FIG. 1A. The total retainage so far is entered on Line 5a. The value of the stored materials is entered on Line 5b. The total exclusions from payments for retainage and stored materials is added to the total line for Line 5. Line 6 is calculated as the difference between the work done so far and the retainage. Line 7 is carried over from line 6 in the previous application. As was described above, this is difficult to verify on site without carrying both reports. Line 8 is calculated as a difference between lines 6 and 7. Finally, the balance is calculated as the difference between Lines 3 and 6. As is readily apparent, the amount of work that is involved in generating each Application and Certificate for Payment is substantial, but the amount of work to verify each application from multiple contractors and subcontractors is even more substantial since the applications are not correlated and may be segmented as many ways as there are (sub)contractors.

SUMMARY OF THE INVENTION

It is an object of the present invention to provide a more efficient method and system for tracking the progress of a project, either construction or otherwise.

It is another object of the present invention to provide a coordinated method and system which breaks down construction project into uniform or non-uniform regions to enable a uniform tracking of payment requests.

It is yet another object of the present invention to provide a computer-based tracking system that coordinates work requests to enable a reviewer to more efficiently analyze what work has been done in each area that the reviewer visits.

It is a further object of the present invention to provide consolidated reports that can be carried by a reviewer, each of the consolidated reports provides a region-by-region break down of the construction site.

It is another object of the present invention to provide a handheld computer that can be carried by a reviewer to provide consolidated reports in a region-by-region break down of the construction site.

It is yet another object of the invention to generate Application and Certificate for Payment requests from the computer-based tracking system based on the site breakdown on a contractor-by-contractor or sub-contractor-by sub-contractor basis.

It is another object of the invention to provide a data exchange method for electronically exchanging data representing the work done in a previous month.

It is yet another object of the invention to generate modified copies of Application and Certificate for Payment requests from the computer-based tracking system based on changes made by a reviewer while inspecting work done.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIGS. 1A and 1B are simulated copies of Form G702 of an Application and Certificate for Payment;

FIG. 2 is a simulated copy of Form G703 of an Application and Certificate for Payment;

DETAILED DESCRIPTION OF THE PREFERRED EMBODIMENT

Figure 3:
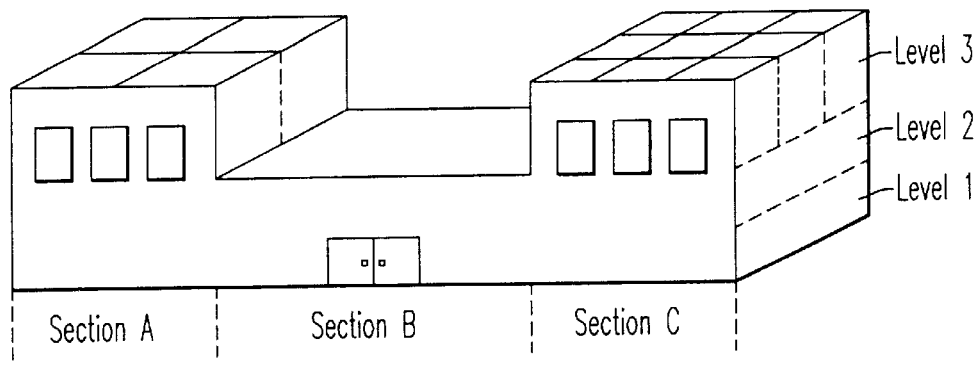
FIG. 3 is a schematic illustration of a construction project to be tracked.

Referring now to the drawings, in which like reference numerals designate identical or corresponding parts throughout the several views, FIG. 3 is a schematic illustration of an exemplary construction project to be tracked. As would be evident to one of ordinary skill in the art, this general breakdown does not include details of the actual work to be performed in each region but is meant to be illustrative of one possible breakdown of a construction site. For illustrative purposes only a proposed building has been partitioned into three different sections, each section has a number of levels, and each level of each section can be broken down into regions. Although it is believed that most sites can be adequately described in three partitioning groups—i.e., the tuple (section, level, region)—, additional partitioning groups are also possible As would be readily apparent to one of ordinary skill in the art, for some projects uniform grouping will be appropriate, while other projects, such as the one shown in FIG. 3, the groupings may be non-uniform. In particular, FIG. 3 is split into four regions in section A, one region in section B, and nine regions in section C. The method and system are also not limited to standard rectangular buildings but may also be used to track odd shaped buildings, such as stadiums or arenas.

According to the present invention, each participating (sub)contractor is given a copy of how the site is partitioned. Each (sub)contractor is then responsible for submitting its applications using this partitioning to ensure the uniformity that the architect wishes to impose, the (sub)contractors receive a description of the partitioning from the architect. The description can be delivered either on paper or electronically (such as via floppy disk or other removable media device, or by downloading the description across a network), or can be delivered in a combination of the formats. The description also can be either in textual form or in a graphical format, or in a combination of the two. In one embodiment of the present invention, the partitioning is linked with a computer aided design (CAD) model of the project so that (sub)contractors can more easily visualize to what region each part of the project belongs. If the CAD model exists before the bidding process, the bids can be requested to be partitioned based on regions. If the bids are submitted before partitioning, then each bid will have to be subdivided into region-specific components after the bidding process. This can be done by either the architect, the general contractor or the individual (sub)contractors.

Figure 4:
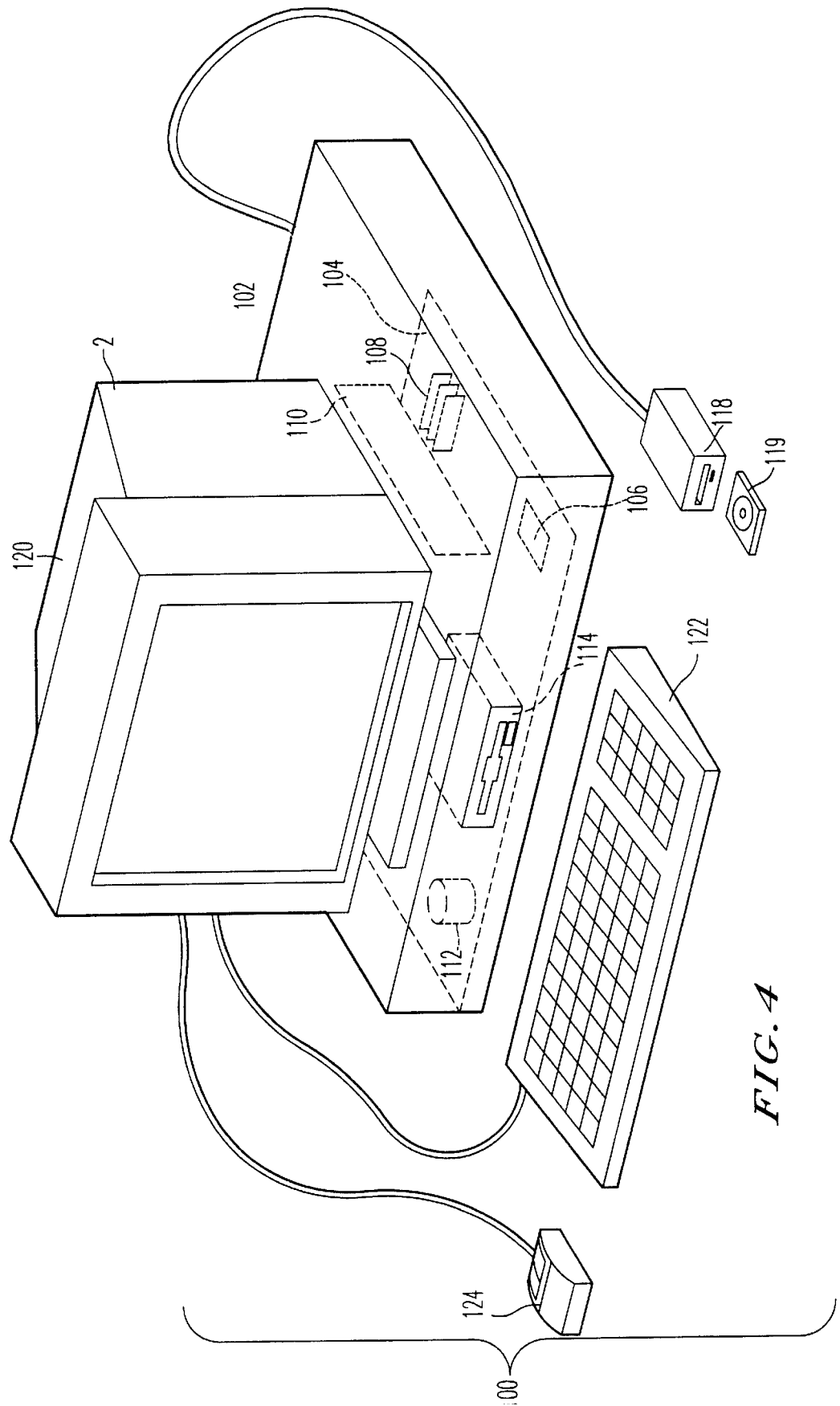
FIG. 4 is a schematic illustration of an illustrative embodiment of a computer for implementing the construction tracking and payment and system.

One embodiment of the present invention is a computer system 100, illustrated schematically in FIG. 4. The computer system 100 has a housing 102 which houses a motherboard 104 which contains a central processing unit (CPU) 106 (e.g. Intel Pentium, Intel Pentium II, Dec Alpha. IBM/Motorola PowerPC, or AMD K6), memory 108 (e.g., DRAM, ROM, EPROM, EEPROM, SRAM and Flash RAM), and other optional special purpose logic devices (e.g.,ASICs) or configurable logic devices (e.g., GAL and reprogrammable FPGA). In addition, according to the invention, the computer system contains analog-to-digital (A/D) inputs (not shown) and a communications adapter (not shown) (e.g., Ethernet, Token-Ring, FDDI, Wireless, PCS, and spread spectrum) for receiving signals and messages from various external sources. The computer 100 further includes plural input devices, (e.g., a keyboard 122 and mouse 124), and a display card 110 for controlling monitor 120. In addition, the computer system 100 includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, IBM MicroChannel, and Ultra DMA). Although compact disc 119 is shown in a CD caddy, the compact disc 119 can be inserted directly into CD-ROM drives which do not require caddies. Also connected to the same device bus or another device bus as the high density media drives, the computer 100 may additionally include a compact disc reader 118, a compact disc reader/writer unit (not shown) or a compact disc jukebox (not shown). In addition, a printer (not shown) is provided to produce the consolidated reports reviewed by the reviewers, copies of the Application and Certificate for Payment based on the data received from the (sub) contractors, and modified copies of the Application and Certificate for Payment based on any adjustments made by the reviewers. In one embodiment, the consolidated reports are printed on 3×5 index cards for ease of transport and reference thereto. The system of the present invention can also generate and print summaries for the owners or general contractors along any partitioning division requested, i.e., by section, or by section by floor. In yet another alternate embodiment, a specialized check writer is provided to the owner to generate payment checks from the verified applications.

As described, the computer system includes at least one computer readable medium. Examples of applicable computer readable media are compact discs 119, hard disks 112, floppy disks, tape, magneto-optical disks, PROMs (EPROM, EEPROM, Flash EPROM), DRAM, SRAM, SDRAM, EDORAM, FRAM, and other volatile and nonvolatile memories. Stored on any one or on a combination of the computer readable media, the present invention includes software for controlling both the hardware of the computer 100 and for enabling the computer 100 to interact with a human user and other external computers or devices. Such software may include, but is not limited to, device drivers, operating systems, database programs (e.g., FoxPro, Sybase products, Oracle products, Microsoft Access, and IBM DB/2), database connection tools (e.g., Powerbuilder, ActiveX, and Java), and user applications, such as development tools and (graphical) system monitors. Such computer readable media further includes a computer program, according to the present invention, for operating the computer to perform the method of tracking and payment. The computer code implementing the present invention is referred to generally as a computer code mechanism and may include, but is not limited to, interpreted or compiled code in any format, including application programs, dynamic link libraries, scripts, Java classes, modules and subroutines.

According to the present invention, the computer system 100 is used to generate a breakdown specified by the architect. The (sub)contractors are then responsible for creating the data indicating each individual work entry awarded to it. This data includes data such as a unique identification of each job, a type of job code specified by the American Institute of Architects, a total job value, a retainage per job, job scheduling information, material costs. This data may also be generated by the architect in an alternate embodiment.

After a project commences, the architect receives monthly updates from (sub)contractors. The updates are either sent to the architect on removable media devices or they are electronically uploaded to the architect in the reverse process described for downloading above. The monthly updates are described in a format specified by the architect to facilitate data exchange. If a self describing format is not used, then typically a text-based or database-record format is used. However, any structured form at can be used for data exchange. In the preferred embodiment, each monthly update includes uniquely identifiable work entries and the work performed for each work entry. The monthly updates for each work entry can be expressed either in percentage format or in dollar format, but percentage is preferable. The monthly updates are sorted by the present invention into work completed in the different regions specified by the architect. The consolidated reports are generated region-by-region by including work done by each (sub)contractor on the index card or report form associated with that region. From the percentage completions information, the system can automatically calculate and include total percentage completion, total amount of contract remaining, total dollar value of work completed so far and in the last month, retainage, and any other calculated field. Multiple regions can be placed on a single sheet of paper or index card, but in the preferred embodiment each region is assigned its own card. This facilitates in dividing the work between reviewers. With each region displayed on the cards, all materials and labor can be listed in "percentage complete" form or in dollar complete form, with "percentage complete" being the preferred embodiment. Stored materials are also listed, preferably in dollar of amounts, but percentage amounts are also possible.

The reviewers then receive the cards or reports for each area that they are to review. The reviewers inspect each region to which they are assigned and note any discrepancies on the reports or cards. A meeting may be required to resolve any discrepancies. The corrections are made by entering changed values into the system on a per work entry per region basis as necessary. The system can then generate the G702 and G703 forms to request payment. Since the information has been verified before printing, the owner may quickly authorize each application. As described above, a check may be printed or an electronic transfer may also be authorized by the system to provide greater efficiency.

In another embodiment of the present invention, the processing is performed completely on a handheld computer 200 which is programmed as described above in relation to the computer system 100. In this embodiment, all data housing, transfer and analysis is implemented in the handheld computer 200. In yet another embodiment, the computer system 100 serves as a host computer and allows an operator to "log on" or connect to the host computer (such as via the World Wide Web using the HTTP or SHTTP protocols) from the handheld computer 200. In this embodiment, the handheld computer would include a terminal emulator, a WWW browser (such as Microsoft's Internet Explorer or Netscape's Navigator or Communicator), or a customized data retrieval and manipulation program. Since handheld computers 200 may not have sufficient storage, memory or processing power to perform the tracking of the present invention, the task of data storage and query is off-loaded to the computer system 100 find the handheld computer 200 is used as a simpler and cheaper communications and display device. In this embodiment, the handheld computer 200 sends a message querying the status of a particular region to the computer system 100, the computer system 100 performs a lookup of what work should be checked in that region, and the computer system 100 sends back (textually or graphically) a consolidated report of all contractors and subcontractors by region.

Figure 5:
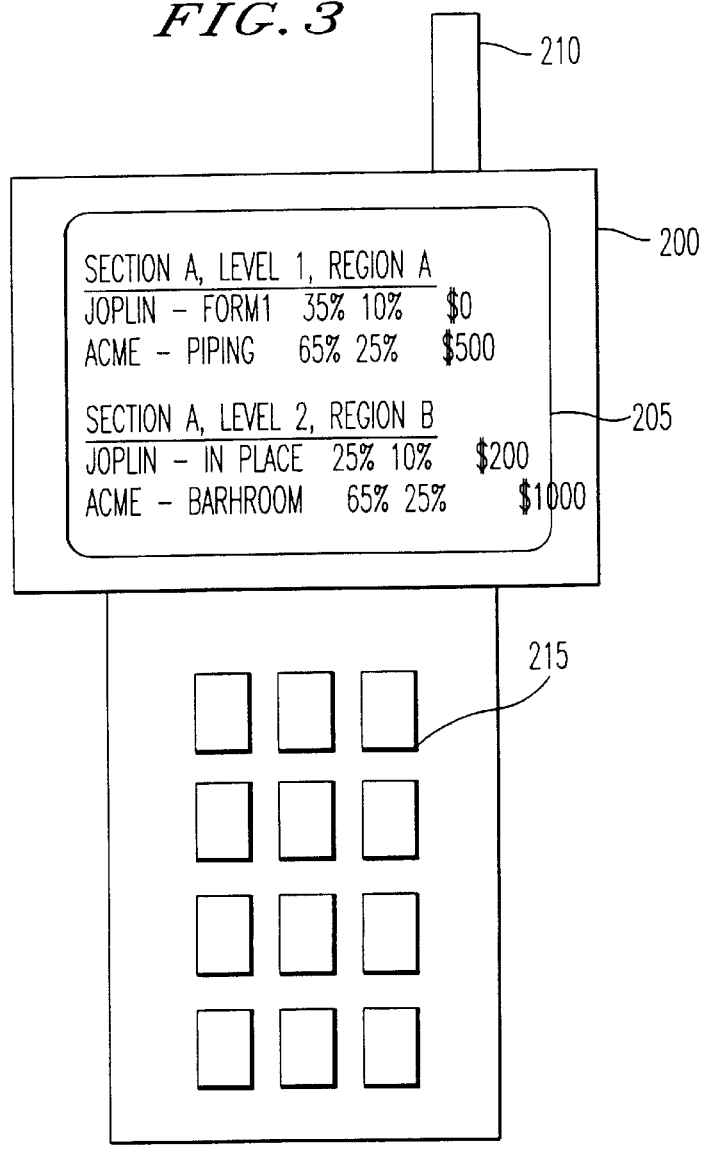
FIG. 5 is a schematic illustration of a handheld computer for providing on-site tracking by displaying work done on a region-by-region basis.

One such report is shown in FIG. 5 on the screen 205 of the handheld computer 200, although a portable computer can also be used. The screen 205 may be either active or passive matrix, LCD or any other type of screen suitable for handheld use. Likewise, the screen may also support input via a pen or light interface. The handheld computer is shown with an antenna 210 and input keys 215. The antenna may be for any communications device that provides long enough range to reach a receiver. Examples of such a communications device are cellular (digital or analog,), spread spectrum, PCS, or devices compatible with the campus-wide Ricochet system provided by Metricom, Inc. The input keys 215 can be either alphanumeric keys or specialized keys for performing identifying and tracking functions. In the example of FIG. 5, region A of the first level of Section 1 has had 35% of the work of Joplin Concrete Co.'s Job 1 performed previously and payment for 10% additional work in the current month is being requested. In addition. there are no materials on site for this work entry. Likewise in Region B of the first floor of Section A, Acme Plumbing has previously been paid for 65% of its work on piping and is requesting payment for an additional 25%. Acme, however, has $500 of materials on site.

In an alternate embodiment, the handheld system 200 may also be equipped with a Global Positioning System (GPS) to help the reviewer determine in which region he/she is presently standing. In this embodiment, the handheld computer relays the GPS information to the remote computer system 200, and the computer system 200 returns to the handheld computer 200 either a list of possible regions which are close to the received GPS position, or the work information if the position can be determined uniquely. When a list of possible positions is sent, the positions can be displayed in any format desired by the user. These formats include menus and hypertext and can be arranged in a list or in a partially expanded tree form with sections as the root(s) of the tree and regions or sub-regions as the leaves. In another embodiment of the handheld computer 200, the handheld computer performs database queries and updates remotely but performs the analysis locally.

Obviously. numerous modifications and variations of the present invention are possible in light of the above teachings. It is therefore to be understood that within the scope of the appended claims, the invention may be practiced otherwise than as specifically described herein.

What is claimed as new and desired to be secured by Letters Patents of the united states is:

1. A computer-implemented system for controlling a central processor, the computer-implemented system comprising:
    a first computer code mechanism for receiving information from at least two (sub)contractors in a (level-by-level, region-by-region) format specific to a construction job specified by an architect, wherein regions are subdivisions of levels;
    a second computer code mechanism for consolidating the information from the at least two (sub)contractors using the (level-by-level, region-by-region) format; and
    a third computer code mechanism for printing the consolidated information using the (level-by-level region-by-region), format.

2. The computer-implemented system as claimed in claim 1, further comprising a floppy disk drive, wherein the first computer code mechanism comprises a fourth computer code mechanism for reading periodic updates from a floppy disk in the floppy disk drive.

3. The computer-implemented system as claimed in claim 1, further comprising a communications adapter, wherein the first computer code mechanism comprises a fourth computer code mechanism for reading periodic updates from the communications adapter.

4. The computer-implemented system as claimed in claim 1, wherein the first computer code mechanism comprises a fourth computer code mechanism for reading periodic updates from a database.

5. The computer-implemented system as claimed in claim 1, wherein the first computer code mechanism comprises a fourth computer code mechanism for reading periodic updates from a file.

6. The computer-implemented system as claimed in claim 1, further comprising a fourth computer code mechanism for partitioning the construction job into plural regions.

7. The computer-implemented system as claimed in claim 1, further comprising:
    a fourth computer code mechanism for receiving periodic updates; and
    a fifth computer code mechanism for modifying the periodic updates based on a review of a corresponding region by a reviewer.

8. The computer-implemented system as claimed in claim 1, further comprising a fourth computer code device configured to consolidate the information consolidated by the second computer code device into information in (section-by-section, level-by-level, region-by-region) format, wherein the third computer code device includes a fifth computer code device configured to print out the information in the (section-by-section, level-by-level, region-by-region) format.

9. The computer-implemented system as claimed in claim 1, wherein the third computer code mechanism comprises a fourth computer code mechanism for printing the consolidated information to a screen of a handheld computer.

10. The computer-implemented system as claimed in claim 9, further comprising:
    a GPS receiver; and
    a fifth computer code device configured to receive information from the GPS receiver and determine in which region the handheld computer is located, wherein the fourth computer code device prints to the screen the consolidated information corresponding to the region in which the handheld computer is located.

11. The computer-implemented system as claimed in claim 1, wherein the third computer code mechanism comprises a fourth computer code mechanism for printing the consolidated information to a screen of a portable computer.

12. The computer-implemented system as claimed in claim 11, further comprising:
    a GPS receiver; and
    a fifth computer code device configured to receive information from the GPS receiver and determine in which region the portable computer is located, wherein the fourth computer code device prints to the screen the consolidated information corresponding to the region in which the portable computer is located.

13. A computer program product, comprising:
    a computer storage medium and plural computer program code mechanisms embedded in the computer storage medium for causing a computer to track progress on a construction project, the plural computer program code mechanisms comprising:
    a first computer code mechanism for receiving information from at least two (sub)contractors in a (level-by-level, region-by-region) format specific to a construction job specified by an architect, wherein regions are subdivisions of levels;
    a second computer code mechanism for consolidating the information from the at least two (sub)contractors using the (level-by-level, region-by-region) format; and
    a third computer code mechanism for printing the consolidated information using the (level-by-level, region-by-region) format.

14. The computer program product as claimed in claim 13, further comprising a fourth computer code device configured to consolidate the information consolidated by the second computer code device into information in (sectionby-section, level-by-level, region-by-region) format, wherein the third computer code device includes a fifth computer code device configured to print out the information in the (section-by-section, level-by-level, region-by-region) format.

15. The computer program product as claimed in claim 13, wherein the first computer code mechanism comprises a fourth computer code mechanism for receiving periodic updates.

16. The computer-implemented system as claimed in claim 13, wherein the third computer code mechanism comprises a fourth computer code mechanism for printing the consolidated information to a screen of a handheld computer.

17. The computer-implemented system as claimed in claim 13, wherein the third computer code mechanism comprises a fourth computer code mechanism for printing the consolidated information to a screen of a portable computer.

* * * * *